US00RE40482E

(19) United States
(12) Reissued Patent
Haeselich

(10) Patent Number: US RE40,482 E
(45) Date of Reissued Patent: Sep. 9, 2008

(54) PRACTICE AMMUNITION

(75) Inventor: Detlef (Ted) Haeselich, Muessen (DE)

(73) Assignee: Nico-Pyrotechnik Hanns-Juergen Diederichs GmbH & Co. KG, Trittau (DE)

(21) Appl. No.: 11/063,225

(22) PCT Filed: May 11, 2000

(86) PCT No.: PCT/DE00/01532

§ 371 (c)(1),
(2), (4) Date: Jan. 29, 2002

(87) PCT Pub. No.: WO00/73730

PCT Pub. Date: Dec. 7, 2000

Related U.S. Patent Documents

Reissue of:
(64) Patent No.: 6,619,211
Issued: Sep. 16, 2003
Appl. No.: 09/980,190
Filed: Jan. 29, 2002

(30) Foreign Application Priority Data

Jun. 2, 1999 (DE) ..... 199 25 404

(51) Int. Cl.
*F42B 8/00* (2006.01)

(52) U.S. Cl. ..... 102/513; 102/502; 102/529; 102/444

(58) Field of Classification Search ..... 102/513, 102/502, 529, 395, 458, 498, 444, 367, 370, 102/477; 362/34
See application file for complete search history.

(56) References Cited

U.S. PATENT DOCUMENTS 3,612,857 A * 10/1971 Beatty et al. ..... 362/34
3,764,796 A * 10/1973 Gilliam et al.
3,774,022 A * 11/1973 Dubrow et al. ..... 362/34
3,940,605 A * 2/1976 Gerber ..... 362/34

(Continued)

FOREIGN PATENT DOCUMENTS

| | | | |
|---|---|---|---|
| CH | 381565 | * | 4/1962 |
| DE | 1 199 660 | * | 4/1963 |
| FR | 502919 | * | 5/1920 |
| FR | 566327 | * | 2/1924 |
| GB | 172580 | * | 12/1921 |

*Primary Examiner*—James S. Bergin
(74) *Attorney, Agent, or Firm*—Milde & Hoffberg, LLP

(57) ABSTRACT

[A practice ammunition projectile comprises a head which bursts when the projectile strikes a target and contains a marking agent which optically indicates the point of impact after the head has burst. The marking agent consists of several chemical components (7, 8) which are each contained in separately breakable compartments (4, 5) within a burstable hood at the head of the projectile. When the compartments (4, 5) break open the compartments combine and undergo a chemical reaction which creates an optical mark. The hood is formed of an optically transparent material to enable the trajectory of the projectile to be tracked.] *An ammunition cartridge comprising a hollow projectile and a cartridge case with a propellant charge, the projectile comprising a projectile head designed to withstand the forces applied when the projectile is fired from a gun and designed to burst when the projectile strikes a target. A marking agent is disposed in the head for optically marking the impact with the target after the head has burst. The marking agent includes a plurality of chemical components each received in a separate frangible compartment in the head. These components are mixed and react chemically with each other when the compartments break up, causing the mixed components to luminesce. The compartments are designed to be broken up by the initial acceleration and/or the centrifugal forces on the projectile when the projectile is fired from a gun, while retaining the chemical components in the head. The components are therefore mixed at the time the projectile is fired from a gun and luminesce by the time the projectile strikes the target.*

5 Claims, 1 Drawing Sheet

U.S. PATENT DOCUMENTS 4,505,200 A * 3/1985 Bush ..... 102/370
4,553,481 A * 11/1985 Ricci ..... 102/458
4,682,544 A 7/1987 Koroscil et al.
4,706,568 A * 11/1987 Lundwall et al. ..... 102/513
5,001,880 A * 3/1991 Smith ..... 102/513
5,018,450 A * 5/1991 Smith ..... 102/513
5,639,526 A * 6/1997 Kotsiopoulos et al. ..... 102/513
6,145,441 A * 11/2000 Woodall et al. ..... 102/513
6,230,630 B1 * 5/2001 Gibson et al. ..... 102/513
6,393,992 B1 * 5/2002 Vasel et al. ..... 102/502
6,497,181 B1 * 12/2002 Manole et al. ..... 102/513
6,990,905 B1 * 1/2006 Manole et al. ..... 102/513

* cited by examiner

PRACTICE AMMUNITION

Matter enclosed in heavy brackets [ ] appears in the original patent but forms no part of this reissue specification; matter printed in italics indicates the additions made by reissue.

BACKGROUND OF THE INVENTION

The invention relates to practice ammunition including a marking agent.

In the use of practice ammunition of this kind—such as practice shells and practice bombs—it is important to mark the impact site so as to obtain optimum practice results. To this end, the practice ammunition comprises a head with a chamber containing a marking agent, preferably a powder with a reddish color. The head is made of a material which when striking a target will burst and release the colored powder. The powder is scattered within some radius about the impact site, thus marking the latter optically. However, the colored powder is visible only under conditions of sufficient brightness; under low light or at night it will not be visible unless powerful night viewing equipment is used.

The U.S. Pat. No. 5,018,450 discloses a practice projectile in which the marking agent is contained in a burstable hood at the head of the practice projectile. The marking agent has chemical components contained in separate frangible compartments which are mixed and react chemically as the compartments burst when the practice projectile strikes its target, this chemical reaction causing the optical marking to be produced. A practice projectile of this kind will make its impact visible at night as well.

The German Patent Publication No. DE-AS 11 99 660 discloses a practice projectile to be fired from a barrel-type weapon and also having a marking agent comprising chemical components contained in a plurality of separate frangible compartments. In this projectile, these compartments are designed to burst when the projectile leaves the muzzle. This will cause the practice projectile to come apart and to eject from the muzzle of the barrel a mushroom-shaped cloud of smoke visible from a great distance. The firing of live ammunition will thus be simulated in a more realistic manner.

SUMMARY OF THE INVENTION

It is a principal object of the present invention to improve upon a practice ammunition projectile of the type described above including a chemically reactive marking agent, and to enable its trajectory to be observed, if desired.

This object, as well as further objects which will become apparent from the discussion that follows, are achieved, in accordance with the present invention, by providing compartments for the chemical components, which are adapted to be broken up by the initial acceleration forces and/or the centrifugal forces applied to the projectile when it is fired, and by providing a hood, surrounding the compartments, which is formed of optically transparent material to enable the trajectory of the practice projectile to be tracked.

In accordance with the invention, the compartments containing the chemical components are broken up as early as in the initial and/or the twist acceleration phases. The compartments are individually contained in a hood made of an optically transparent material and located at the head of the practice projectile. On impact, the hood will burst and release the marking agent to identify the impact side. At the same time, the optically transparent hood enables the marking—such as the chemoluminescent effect of the chemically reacting components—to be perceived along the entire trajectory of the practice projectile. The chemical components are selected to produce a sustained luminous effect lasting for an extended period of time, enabling the practice projectile to be optically tracked along its entire trajectory, and additionally to mark the impact site.

The duration of the chemical reaction, as well as the frequency and the brightness of the emitted light, may be adjusted within broad ranges by properly selecting the chemically reactive components. The reaction preferably produces sustained luminous effects so that the trajectory of the practice ammunition may be optically tracked, and so that the impact site will be marked.

The present invention preferably uses starting materials which, when chemically reacted, emit light in the visible or infrared ranges. If emitted in the infrared range, the marking light may be observed with night viewing equipment.

Swiss Patent No. CH 381 565 discloses a practice projectile comprising a transparent hood at the head thereof which will burst on impact, such hood containing a marking material such as a colored powder. However, this optically transparent hood is intended only to recognize the color of the powder so as to distinguish various types of projectiles, such as practice projectile and live ammunition. It is not possible with like designs to track the trajectory of the projectile.

For a full understanding of the present invention, reference should now be made to the following detailed description of the preferred embodiments of the invention as illustrated in the accompanying drawings.

DESCRIPTION OF THE PREFERRED EMBODIMENTS

Figure 2:
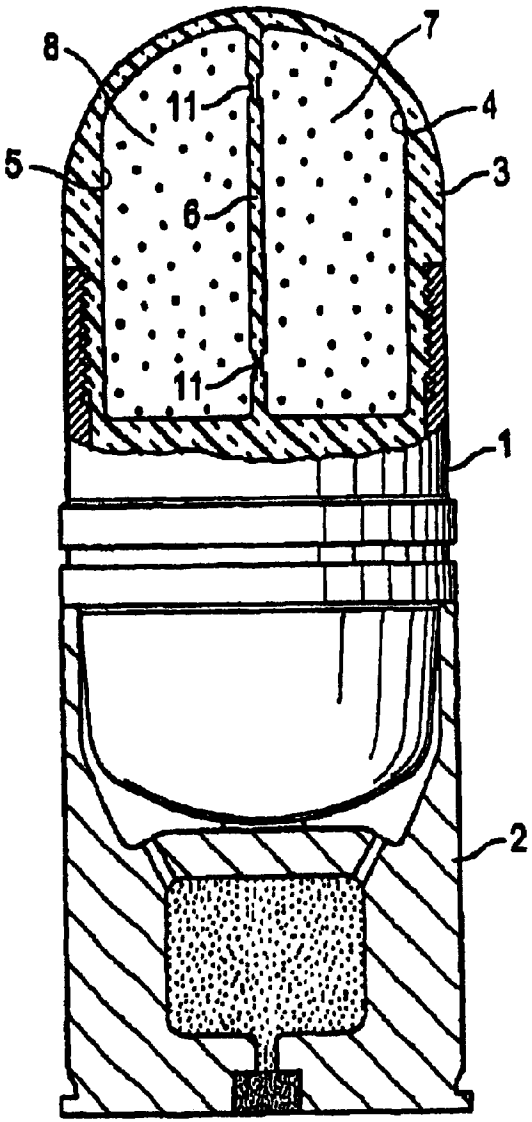
FIG. 2 shows a longitudinal section through a practice projectile according to another embodiment of the invention.

The preferred embodiments of the present invention will now be described with reference to FIGS. 1 and 2 of the drawings. Identical elements in the various figures are designated with the same reference numerals.

Figure 1:
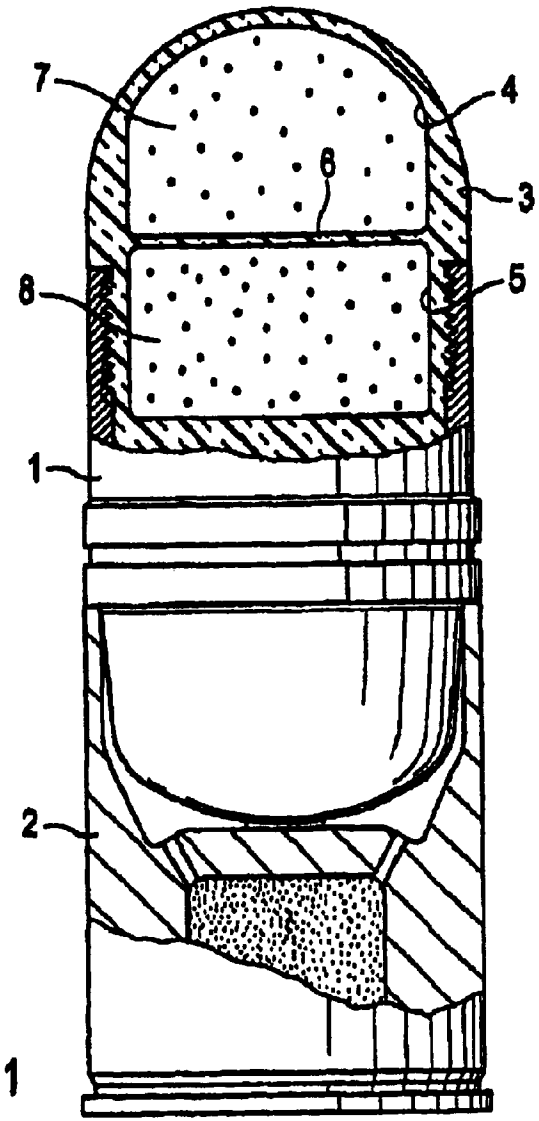
FIG. 1 shows a longitudinal section through practice ammunition in the form of a practice cartridge comprising an inventive practice projectile and a case receiving the latter.

FIG. 1 shows a practice projectile 1 received in a cartridge case 2. The head of practice projectile 1 has a hood 3 consisting of a transparent material—such as a plastic material—and covering a first compartment 4 and a second compartment 5. The two compartments are arranged one on top of the other and are separated from each other by a partition 6 therebetween. The first compartment is filled with a first chemical component 7 such as an oxidant and the second compartment is filled with a second chemical component 8 such as a reducing agent.

When the partition is broken up by the force of the acceleration generated during firing, for example, the chemical reaction of the two chemical components causes chemoluminescent light to be emitted which is visible through the transparent hood while the projectile is flying. On striking the target, the hood bursts, causing the end products of the reaction to be scattered in the vicinity of the impact site, whereby the emitted light marks that site optically and is visible from great distances.

FIG. 2 shows an inventive practice projectile 1 in which the head and its transparent hood 3 are designed to include a first compartment 4 holding a first chemical component 7 and a second compartment 5 holding a second chemical component 8, said compartments placed in a side-by-side longitudinal relationship. The compartments are separated longitudinally by a partition 6, which is designed to be broken up by the centrifugal force produced by the twist of a twist-stabilised practice projectile, for example, to enable the chemical reaction to take place which constitutes the marking means. In both embodiments (FIG. 1 and FIG. 2), the partitions may be provided with predetermined breaking points. Such breaking points are shown as thin regions 11 in FIG. 1.

There has thus been shown and described a novel practice ammunition projectile which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. [In a practice] *An* ammunition [projectile] *cartridge* comprising a *hollow projectile and a cartridge case with a propellant charge, the projectile comprising a projectile* head designed *to withstand the forces applied when the projectile is fired from a gun and designed* to burst when the projectile strikes a target [and to receive]*; wherein* a marking agent *is disposed in the head for* optically [indicating] *marking* the impact *with the target* after the head has burst[.]*; wherein* said marking agent [contained in a burstable hood at the head of the practice projectile and comprising] *includes* a plurality of chemical components each received in a separate frangible compartment *in the head*, said components being mixed and reacting chemically with each other [as] *when* the compartments break up, causing the [optical marking reaction to be produced, the improvement] *mixed components to luminesce; and* wherein the compartments are [adapted] *designed* to be broken up by at least one of the initial acceleration and the centrifugal forces on the projectile when [in use, and wherein the hood is formed of an optically transparent material to enable the trajectory of the projectile to be tracked] *the projectile is fired from a gun, while retaining the chemical components in the head*;

*whereby the components are mixed at the time the projectile is fired from a gun and luminesce by the time the projectile strikes the target.*

2. [Practice ammunition projectile] *Ammunition cartridge* as in claim 1, wherein the optical marking is visible in the infrared range.

3. [Practice ammunition projectile] *Ammunition cartridge* as in claim 1, wherein the optical marking emits light in the visible and infrared ranges.

4. [Practice ammunition projectile] *Ammunition cartridge* as in claim 1, wherein the compartments are separated by partitions and said partitions have predetermined breaking points therein.

*5. Ammunition cartridge as in claim 1, wherein the head includes a burstable hood formed of an optically transparent material and containing the marking agent to enable the trajectory of the projectile to be tracked.*

* * * * *